United States Patent [19]

Bourne

[11] Patent Number: 4,602,812
[45] Date of Patent: Jul. 29, 1986

[54] ADJUSTABLE DOUBLE HOOK LATCH
[75] Inventor: William R. Bourne, Anaheim, Calif.
[73] Assignee: Hartwell Corporation, Placentia, Calif.
[21] Appl. No.: 496,637
[22] Filed: May 20, 1983
[51] Int. Cl.⁴ .............................................. E05C 5/02
[52] U.S. Cl. .......................... 292/113; 292/DIG. 31; 292/DIG. 49; 292/DIG. 60
[58] Field of Search ............. 292/113, 247, DIG. 49, 292/DIG. 31, DIG. 60

[56] References Cited
U.S. PATENT DOCUMENTS

| | | | |
|---|---|---|---|
| 2,712,955 | 7/1955 | Andrews | 292/113 |
| 2,894,777 | 7/1959 | Hogan | 292/113 |
| 2,904,141 | 9/1959 | Henrichs | 189/35 |
| 2,927,812 | 3/1960 | Smith et al. | 292/196 |
| 3,194,595 | 7/1965 | Wheeler et al. | 292/113 |
| 3,318,624 | 5/1967 | Poe et al. | 292/113 |
| 3,428,348 | 2/1969 | Swanson | 292/113 |
| 3,664,696 | 5/1972 | Poe | 292/26 |
| 4,116,479 | 9/1978 | Poe | 292/113 |
| 4,183,564 | 1/1980 | Poe | 292/113 |
| 4,243,255 | 1/1981 | Hornak | 292/113 |
| 4,318,557 | 3/1982 | Bourne et al. | 292/113 |

Primary Examiner—Richard E. Moore
Attorney, Agent, or Firm—Lyon & Lyon

[57] ABSTRACT

A double hook latch includes a hook assembly, and means for adjusting the position of the hook assembly relative to a keeper arm. Each hook is mounted to independently rotate and the hook assembly can pivot to accommodate misalignment of a keeper arm.

3 Claims, 4 Drawing Figures

ADJUSTABLE DOUBLE HOOK LATCH

BACKGROUND

Flush type latch assemblies are used extensively on aircraft such as for fastening the two halves of an engine cowling together. A latch assembly typically includes a latch having a hook and a keeper assembly having a keeper arm which is engaged by the hook end of the latch.

Airplane cowlings are subjected to substantial stress and care must be taken so that each latch assembly is properly adjusted to take its share of the load. Latch assemblies where the keeper is adjustable are well known, as for example in U.S. Pat. No. 4,183,564. Also, latch assemblies where the hook can be adjusted lengthwise to compensate for variations in the location of the latch keeper are known, as for example in U.S. Pat. No. 3,318,624.

In some applications, it is desirable that the latch have two hooks to reduce the bending moment on the keeper. With a double hook latch, usually the keeper arm rather than the latch is made adjustable. This adjustment is particularly important with a double hook latch in that if there is unequal loading on the hooks, there is a potential for latch failure.

In some applications, it is undesirable or impossible to use an adjustable keeper. For these applications, there is a need for an adjustable double hook latch that minimizes the possibility of unequal loading on the hooks. Before the invention described below, such a latch was unavailable.

SUMMARY

The present invention is directed to a double hook, adjustable latch that is suitable for airplane cowlings. The latch is designed for use with non-adjustable keepers.

The latch comprises a main body having a longitudinal axis and a hook assembly adjustably slideable along the longitudinal axis of the main body. The hook assembly comprises a hook mounting element such as a bolt and two spaced apart hooks mounted on the bolt to independently rotate in a direction that is perpendicular to the longitudinal axis of the main body. The hook assembly also includes a spacing block mounted on the mounting bolt between the hooks for maintaining the hooks spaced apart from each other. Adjustment of the latch is obtained with means for adjusting the position of the hook assembly along the longitudinal axis of the main body.

Unequal loading on the hooks as well as bending moment on the adjusting means are reduced with a sliding block in the main body positioned between the adjusting means and the spacing block. The sliding block is located contiguous against the spacing block. The sliding block is independently moveable relative to the adjusting means and the spacing block. The contacting surfaces of the sliding block and spacing block are contoured so that the entire hook assembly can pivot relative to the sliding block and the main body in a direction that is perpendicular to the longitudinal axis of the main body and that is also perpendicular to the first direction.

Thus, because the hooks can independently rotate about the mounting bolt and because the entire hook assembly can pivot due to the sliding block, unequal loading on the hooks is minimized.

DRAWINGS

These and other features, aspects, and advantages of the present invention will become better understood with reference to the following description, appended claims, and accompanying drawings, where:

DESCRIPTION

Figure 1:
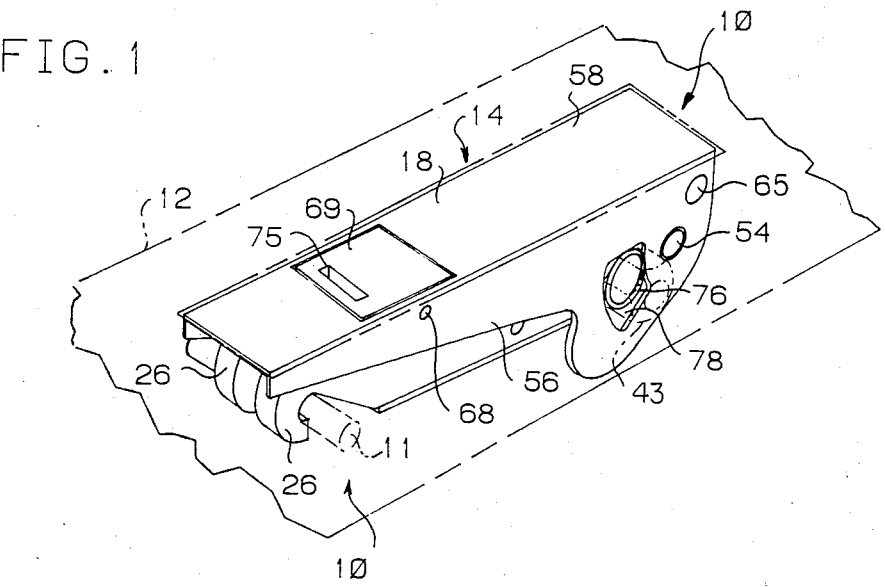
FIG. 1 is a perspective view of a flush latch according to the present invention set in a surrounding surface, the hooks of the latch shown attached to a keeper.

A latch assembly includes a latch 10 and a keeper 11. A flush type latch 10 as shown in the figures is intended primarily for aircraft represented fragmentarily by a skin structure, and particularly a cowling structure 12. The latch assembly is mounted within a rectangular opening in the skin.

The keeper 11 can be in the form of a straight bolt or a U-clamp or other conventional keeper.

The latch 14 includes a handle lever 18 and a latch arm assembly 20. The latch arm assembly 20 includes a main body 22 having central open slot 24 that extends between opposing sides 25 of the main body 22.

Two spaced apart parallel hooks 26 are independently mounted to rotate about a cylindrical mounting element, such as a bolt 28 that extends through the slot 24. The hooks 26 are maintained spaced apart by a spacing block 30 mounted on the mounting bolt 28 between the hooks 26. Each hook 26 slides in a channel 32 on one of the opposing sides 25 of the main body 22. The channels 32 are wider than the hooks so each hook 26 has some play, i.e. each hook 26 can independently rotate about the bolt 28 in a first direction 34 (see FIG. 2) which is transverse to the longitudinal axis of the main body. The direction of the longitudinal axis of the main body is shown by arrow 36 in FIG. 2.

The hooks are biased forwardly by a compression spring 38, one end of which pushes against the spacing block 30 and the other end of which is mounted in a recess 40 in the main body 22.

Mounted in the forward portion of the main body 22 is an adjustment screw 42 which serves to position the hooks along the longitudinal axis of the main body. The adjustment screw is used to manually adjust the tension between the keeper 11 and a mounting bolt 43 used to mount the latch 10 in position.

Between the adjustment screw 42 and the spacing block 30 is a sliding block 44. The sliding block 44 is semi-curcular in cross-section, the flat surface 46 being up against the adjustment screw 42 and the convex surface 48 being contiguous with a correspondingly curved concave surface 50 of the spacing block 30. Preferably, the radius of curvature of the convex surface 48 of the sliding block 44 and the radius of curvature of the concave surface 50 of the spacing block 30 are equal.

Figure 2:
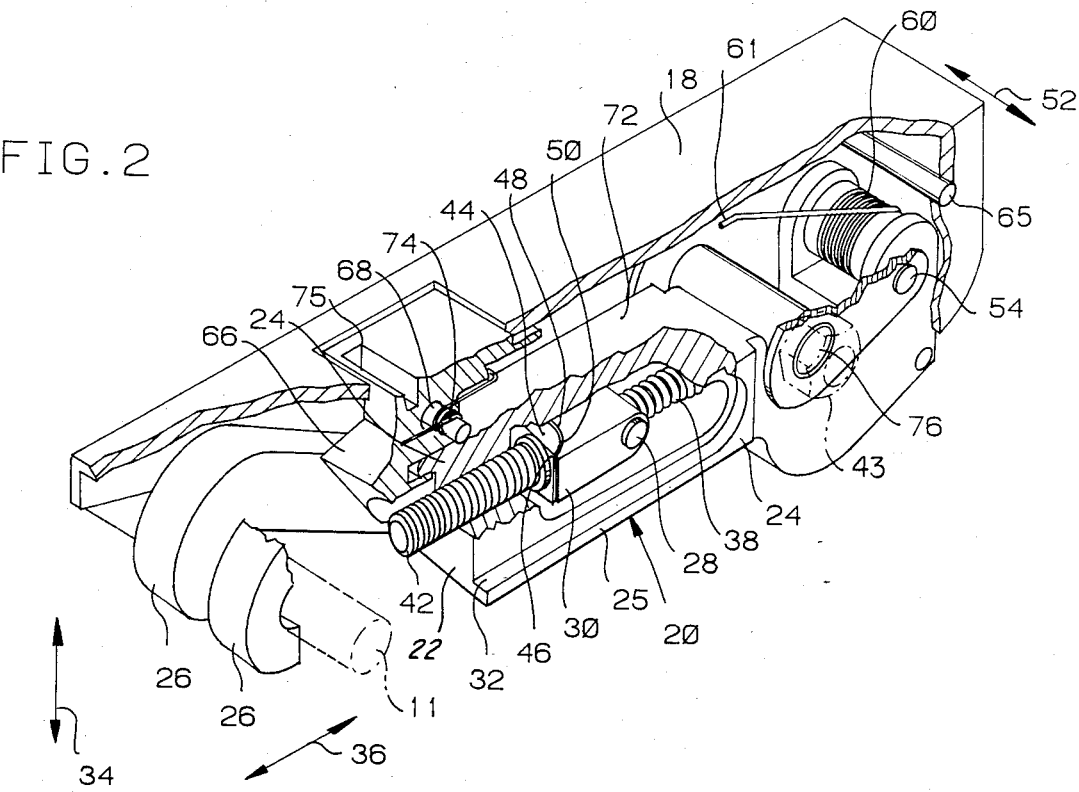
FIG. 2 is a view similar to the view of FIG. 1 with the latch shown partially broken away and in partial section.

Because the contiguous surfaces of the spacing block 30 and the sliding block 44 are suitably contoured, the hooks can pivot relative to the sliding block and the main body in a third direction, generally represented by arrow 52 in FIG. 2, that is transverse both to the longitudinal axis 36 of the main body and the first direction 34. This gives the hooks three degrees of movement, i.e. in the direction of arrows 34, 36, and 52. Because of this, the tension between the latch 10 and the keeper 11 can be better accomodated. In addition, this structure allows compensation for misalignment of the keeper 11. Unequal loading of the two hooks 26 is avoided, and undesirable bending moments in the hook assembly are prevented.

Figure 3:
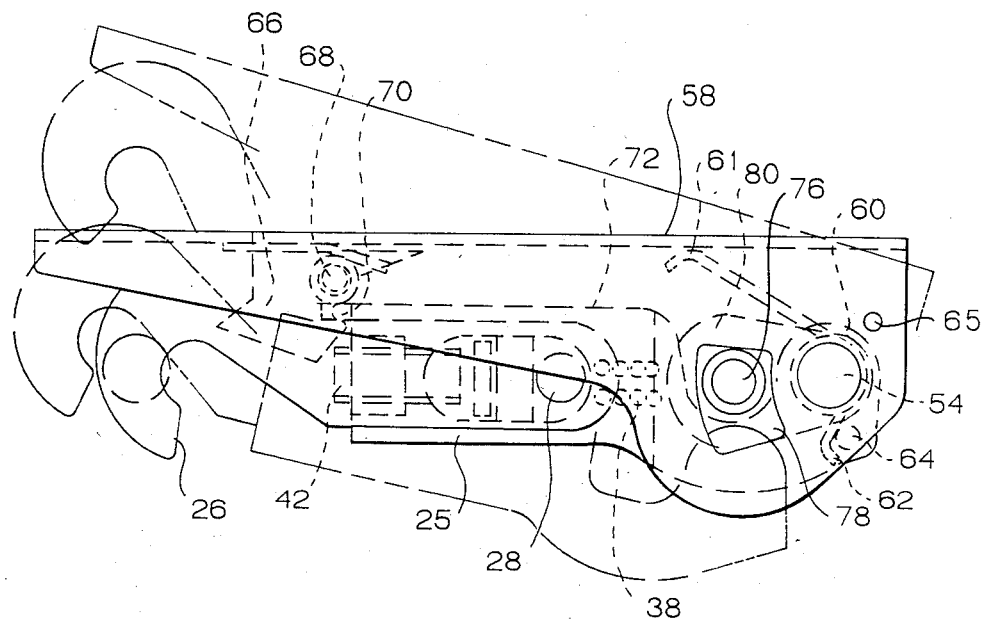
FIG. 3 is a side elevation view of the latch of FIG. 1 showing in phantom the latch open.
Figure 4:
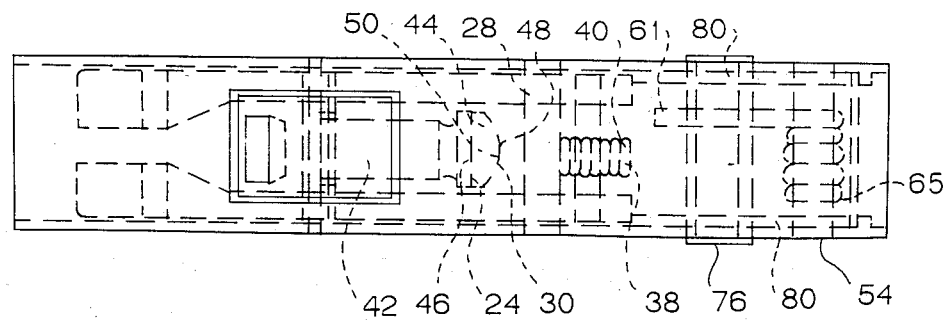
FIG. 4 is a top elevation view of the latch of FIG. 1.

The handle lever 18 and the latch assembly 20 have a closed position shown by solid lines in FIG. 3 and an open position shown in phantom in FIG. 3. The structure of the handle lever 18 is conventional. The handle lever 18 is channel-shaped having parallel side walls 56 and a connecting top wall 58. The handle is contoured to receive the latch arm assembly 20.

The handle lever 18 is connected to the latch arm assembly 20 by a pivot pin 54 and is biased to an open position by a coil spring 60 mounted on the pivot pin 54. One end 61 of the coil spring 60 presses against the underside of the top wall 58 of the handle lever 18. The other end 62 of the coil spring 60 presses against a roll pin 64 extending across the rear of the main body 22. A rivet 65 mounted in the side walls of the handle lever 18 lifts the hooks 26 when the handle lever is moved to its full open position.

A trigger 66 is rotatably mounted on a rivet 68 extending through the side walls 56 of the handle lever 18. The top wall 69 of the trigger 66 is flush with the top wall 58 of the handle lever 18 when the latch 10 is in a closed position. The trigger engages a lip 70 at the forward end of the top wall 72 of the main body 22. The trigger 66 is biased to the closed position by a coil spring 74 mounted on the rivet 68. To open the latch, manual pressure is placed on the top 69 of the trigger 68, either by hand or with a screw driver engaging a slot 75 in the top wall 69 of the trigger, to pivot it away from the lip 70. Then the handle lever 18 can be opened releasing the hooks 26 from the keeper arm 16.

The latch 18 is mounted on an aircraft by the mounting bolt 43 that extends through a bushing 76, the opposite ends of which extend through parallel opposing curved slots 78 in the side walls 56 of the handle lever 18. A pair of links 80 connect the bushing 76 to the pivot pin 54. Because of the curved slots 78, the handle lever 18 can be pivoted away from the latch arm assembly 20 by about 15 degrees without releasing the latch, the exact amount of pivot being determined by the length of the curved slots 78. This allows the tension on the latch to be adjusted with the adjustment screw without releasing the latch.

Although the present invention has been described in considerable detail with reference to certain preferred versions thereof, other versions are possible. Therefore the spirit and scope of the appended claims should not be limited to the description of the preferred versions contained herein.

What is claimed is:

1. A latch suitable for airplane cowlings comprising:
   (a) a main body having a longitudinal axis;
   (b) a hook assembly slideable along the longitudinal axis of the main body, the hook assembly comprising:
      (1) a hook mounting element;
      (2) two spaced apart hooks mounted to independently rotate around the mounting element in a first direction that is perpendicular to the longitudinal axis of the main body; and
      (3) a spacing block mounted on the mounting element between the hooks for maintaining the hooks spaced apart from each other;
   (c) means for adjusting the position of the hook assembly along the longitudinal axis of the main body; and
   (d) a sliding block in the main body positioned between the adjusting means and the spacing block and contiguous with the spacing block, the spacing block being independently moveable relative to the adjusting means and the sliding block, the contiguous surfaces of the sliding block and spacing block being contoured so the hook assembly can pivot relative to the sliding block and the main body in a second direction that is perpendicular to both the longitudinal axis of the main body and the first direction.

2. The latch of claim 1 in which the spacing block has a concave surface and the sliding block has a convex surface, wherein the covex surface of the sliding block is contiguous to the concave surface of the spacing block.

3. The latch assembly of claim 2 wherein the radius of curvature of the concave surface and the radius of curvature of the convex surface are substantially equal.

* * * * *